Sept. 3, 1940.  C. ROEHRI  2,213,327
SPEED CHANGING DRIVE
Filed Dec. 24, 1938  2 Sheets-Sheet 1
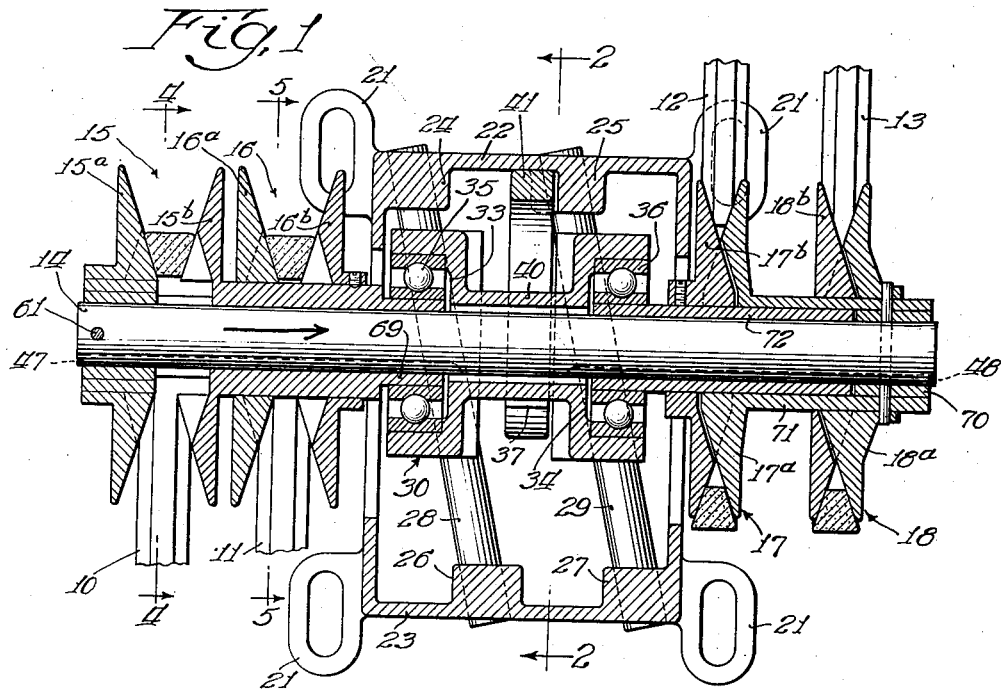
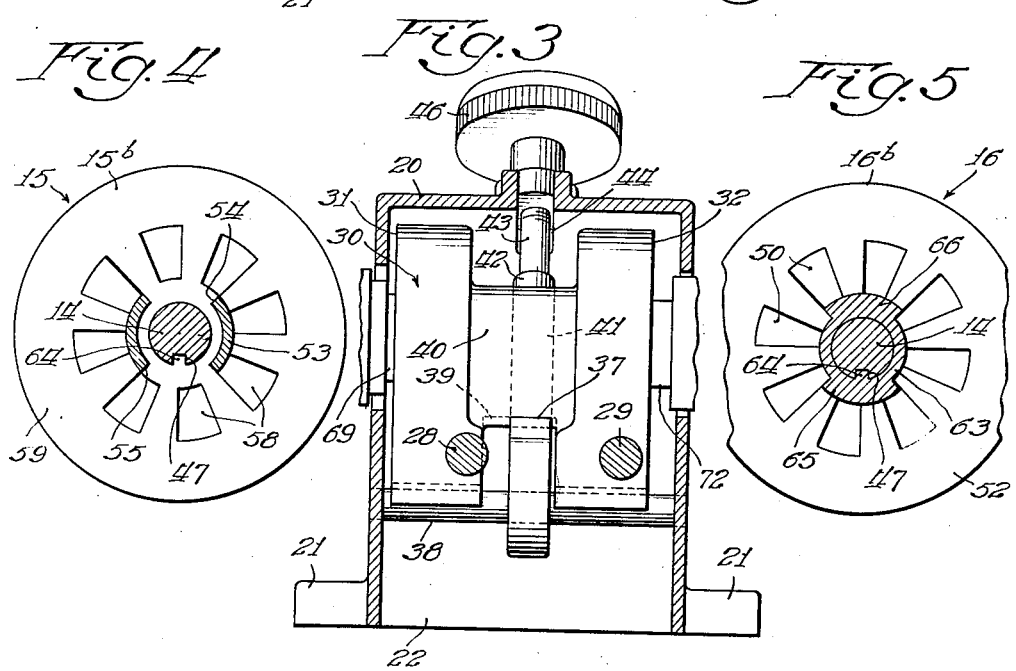
Inventor:
Carl Roehri Sept. 3, 1940.  C. ROEHRI  2,213,327
SPEED CHANGING DRIVE
Filed Dec. 24, 1938    2 Sheets-Sheet 2
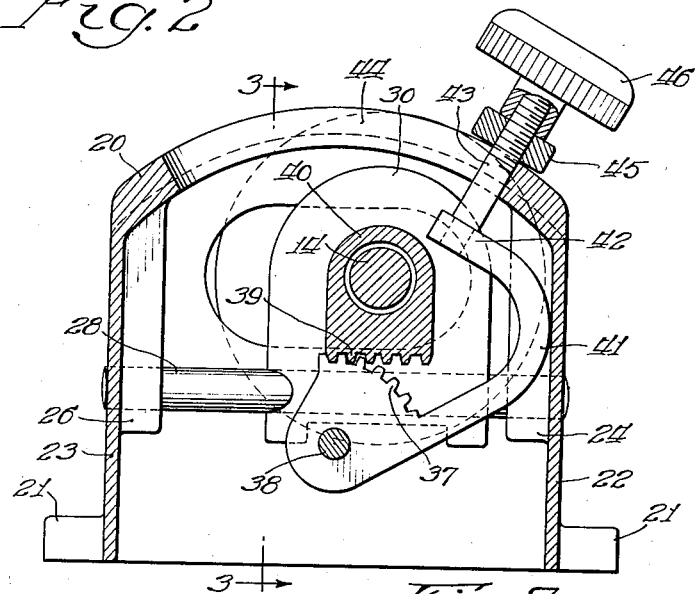
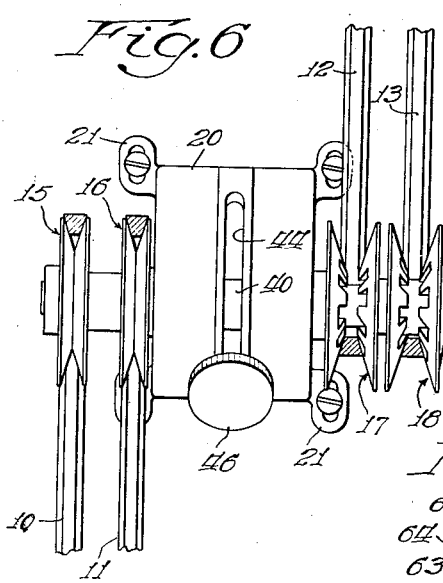
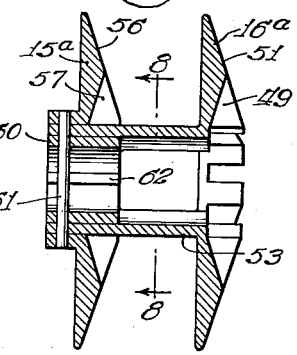
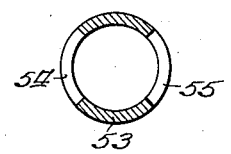
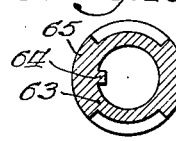
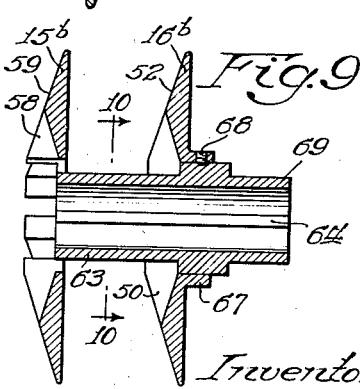
Inventor:
Carl Roehri
By: Zabel Carlson Grigsbaugh & Wells.
Attys Patented Sept. 3, 1940

2,213,327

UNITED STATES PATENT OFFICE 2,213,327

SPEED CHANGING DRIVE

Carl Roehri, Chicago, Ill.

Application December 24, 1938, Serial No. 247,609

3 Claims. (Cl. 74—230.17)

The present invention relates to speed changing devices. It is particularly directed toward that type of speed changer which comprises an intermediate connecting pulley combination wherein a shaft has one or more pulleys thereon adapted to be driven from a source of power, and one or more other pulleys thereon adapted to drive a power consuming device. The variation in speed is obtained by varying the effective diameters of the respective driving and driven pulleys on the shaft. This effective diameter variation is obtained by the utilization of so-called V-belts and pulleys with the side walls tapered. The precise cross-sectional shape of the belt is not important, but it must be of a type that can effect the transmission of power by engaging the tapering walls of the pulley.

It is the purpose of the present invention to provide a novel speed changing transmission of this character which is simple in construction and extremely easy to apply to any given driving condition. The present invention contemplates a transmission which embodies a single shaft carrying a pulley or group of pulleys at each end thereof, the shaft being mounted for sliding movement in the direction of transmission of power from the source to the consuming device. The construction is such that the shaft is also shifted axially in order to permit the effective diameter of the pulleys carried thereby to change.

It is a particular purpose of the present invention to provide a novel supporting and shifting means for the shaft which carries the pulleys, whereby to provide adequate bearing surfaces to hold the shaft against skewing or twisting due to the power which must be transmitted through it.

The features and advantages of the present invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings, Fig. 1 is a plan sectional view through a speed changing transmission device embodying my invention;

Fig. 2 is a sectional view taken on the line 2—2 of Fig. 1;

Fig. 3 is a fragmentary sectional view taken on the line 3—3 of Fig. 2;

Fig. 4 is a fragmentary sectional view on the line 4—4 of Fig. 1;

Fig. 5 is a fragmentary sectional view on the line 5—5 of Fig. 1;

Fig. 6 is a plan view of the speed changing transmission, showing the parts in the opposite position to that shown in Fig. 1;

Fig. 7 is a vertical sectional view taken through the left-hand pulley assembly shown in Fig. 1 and illustrating two of the pulley elements;

Fig. 8 is a sectional view taken on the line 8—8 of Fig. 7;

Fig. 9 is a vertical sectional view through the two pulley elements which cooperate with the two pulley elements shown in Fig. 7 to complete the two pulleys which are shown at the left-hand end of Fig. 1; and Fig. 10 is a sectional view on the line 10—10 of Fig. 9.

Referring now to the drawings, the present invention comprises a speed changing transmission device adapted to transmit power from a suitable source, such as a motor, through a plurality of belts 10, 11, 12 and 13 to a power consuming device. The speed changing transmission device comprises a shaft 14 which carries two pulleys 15 and 16 for the belts 10 and 11 and two pulleys 17 and 18 for the belts 12 and 13. It is possible to vary the effective diameters of the pulleys 15, 16, 17 and 18 by shifting the shaft 14. The operation is as follows: Upon shifting the shaft 14 away from the source of power, the effective diameters of the pulleys 15 and 16 are reduced, while the effective diameters of the pulleys 17 and 18 are increased. This shifting action is of such a nature that the variation in diameters of the pulleys compensates for the change in necessary belt length, so that the belts 10, 11, 12 and 13 remain taut on their pulleys in all positions of the shaft 14. The particular pulley construction will be more fully described hereinafter.

The shaft 14 is movably mounted in a hollow casing 20. The casing 20 is provided with feet 21. The casing is rectangular in shape. The feet 21 are formed at the four lower corners of the casing. The casing 20 has its end walls 22 and 23 provided with bosses 24, 25, 26 and 27. These bosses are drilled to mount two supporting bars 28 and 29. It will be noted that the bosses are so arranged that the bars 28 and 29 do not extend parallel to the side walls of the casing 20, but make an acute angle with the side walls.

The bars 28 and 29 slidably mount a bearing block 30. This bearing block has end faces 31 and 32 which lie parallel to the side walls of the casing 20. A recess 33 is formed in the face 31, and a similar recess 34 is formed in the face 32. These recesses receive ball bearing units 35 and 36 respectively.

The block 30 is slidable on the bars 28 and 29. It is adapted to be operated by a segmental gear 37 which is journalled on a shaft 38 fixed in the side walls of the casing 20 below the bars 28 and 29. Rack teeth 39 are provided on the lower surface of the block 30, the block being reduced intermediate the end faces 31 and 32, as shown at 40. (See Figs. 2 and 3.) The segmental gear 37 has an arm 41 formed integral therewith, and the arm 41 extends upwardly and is bent over to provide a flat pin mounting portion 42 that is high enough to pass over the top of the reduced intermediate portion 40 of the block 30. A pin 43 is mounted on the portion 42 and passes upwardly through a slot 44 that is provided on the top of the casing 20. The pin 43 is screw threaded to receive a nut 45 and an operating knob 46. The teeth 39 on the portion 40 are considerably wider than the segmental gear 37 so that as the block 20 is moved along the bars 28 and 29 by rotation of the segmental gear 37, the gear and rack teeth will remain in mesh, even though the block 20 is being shifted lengthwise of the gear mounting shaft 38.

Referring now to the shaft 14 and its associated pulleys 15, 16, 17 and 18, it is indicated in Fig. 1 that the several pulleys are keyed to the shaft 14 by means of keyways 47 and 48 in the shaft. The several pulleys are made up of pulley sections that are movable toward and away from each other. The pulleys 15 and 16 will be described in detail, as they are quite similar to the pulleys 17 and 18.

To make up the pulleys 15 and 16, I provide a pulley section 16a which is notched as shown at 49, to mesh with a similar pulley section 16b, also notched at 50. (For details of these sections, see Figs. 7 and 9.) The sections 16a and 16b have tapered faces, as illustrated at 51 and 52 for engagement with the belt 11. The section 16a has a hollow shaft portion 53 slightly larger in diameter than the shaft 14 and cut out as shown at 54 and 55. The cut out portions 54 and 55 are extended to and through the body of the section 16a.

At the extreme end of the shaft portion 53 there is mounted the pulley section 15a which forms one-half of the pulley 15. This section 15a has a tapering face 56 for engaging the belt 10 and is provided with notches 57 to receive corresponding notches 58 upon the cooperating section 15b of the pulley 15. The section 15b also has a tapered face 59. A sleeve 60 is fitted in the interior of the shaft portion 53. The section 15a, the shaft portion 53, and the sleeve 60 are pinned to the shaft 14 by a pin 61. The sleeve 60 has a key 62 thereon for engaging the keyway 47 in the shaft 14.

The sections 15b and 16b are rigidly connected together in the following fashion: The section 15b has a hollow shaft portion 63 projecting from the back side thereof. This shaft portion has a key 64 thereon, adapted to ride in the keyway 47. The shaft portion 63 has two external ribs 65 and 66 which are adapted to ride in the slots 54 and 55 provided in the shaft member 53. Near the free end of the shaft portion 63, the ribs 65 and 66 are joined, and the pulley section 16b has a hub portion 67 which is fastened on the shaft portion 63. At this point, any suitable fastening means, such as a set screw 68, may be used. It will be noted that the end of the shaft portion 63, indicated by the numeral 69, extends into the bearing 35.

The pulley sections 15b and 16b are slidable endwise on the shaft 14. The pulley sections 15a and 16a are, however, fixed to the shaft 14. When the sections 15b and 16b are moved away from the sections 15a and 16a, the belts 10 and 11 may approach closer to the shaft 14, thus reducing the effective diameter of the pulleys 15 and 16.

The pulleys 17 and 18 are made up of pulley sections 17a and 18a fixed to the shaft 14 by means of the keyway 48 and a corresponding key on a sleeve 70 within a hollow shaft portion 71 that connects the sections 17a and 18a. The pulleys 17 and 18 have their sections 17b and 18b connected by a hollow shaft portion 72, the free end of which extends into the bearing unit 36. The shaft portion 72 also has a key engaging the keyway 48 of the shaft 14, but it is slidable endwise on the shaft 14. The sections 17a and 17b, 18a and 18b have their central portions cut out in the same manner as the corresponding sections of pulleys 15 and 16, so that the sections can be moved close together, as illustrated in Fig. 1.

In the use of the transmission device which is described, it will be evident that when the parts are in the position shown in Fig. 1 for a given linear speed of the belts 10 and 11, the belts 12 and 13 will have a much higher speed. Now, if it is desired to reduce the speed of the belts 12 and 13, and thereby the speed of the power consuming device, the shaft 14 is moved toward the bottom of Fig. 1, the block 30 being moved along the bars 28 and 29 toward the end wall 23 of the casing 20. The result of this movement is to exert increased tension upon the belts 12 and 13 and to relieve the tension upon the belts 10 and 11, if the pulleys were to remain at the same effective diameter. The change in tension of the belts, however, tends to shift the pulley sections so as to spread the sections of the pulleys 17 and 18 apart and close the sections of pulleys 15 and 16. Actually, this causes the shaft 14 to move endwise, as is indicated by an arrow in Fig. 1. There is nothing to prevent the endwise shifting of the shaft 14 except the pressure of the belts 10 and 11. As the shaft 14 moves in the direction of the arrow shown in Fig. 1, it brings the sections 15a and 16a closer to the sections 15b and 16b, thereby increasing the effective diameters of the pulleys 15 and 16. In the corresponding fashion, the effective diameters of the pulleys 17 and 18 are reduced, thus reducing the speed of the power consuming device for a constant speed of the power source.

The block 30 can be locked permanently in any adjusted position by tightening the nut 45 and the knob 46 so as to lock the arm 41 against movement.

From the above description it is believed that the construction and operation of this device will be readily apparent to those skilled in this art. Having thus described my invention, what I claim as new and desire to secure by Letters Patent is:

1. A speed changer of the character described, comprising a casing, a pair of spaced parallel guide bars fixed in said casing, a shaft supporting block having bearings at its opposite ends, a shaft journalled in said bearings, said block being mounted on said bars for sliding movement, the bars being arranged at an acute angle to a plane perpendicular to said shaft whereby movement of said block on the bars produces an endwise movement of the shaft, a rack on said block and a segmental gear pivoted in said casing for engaging said rack to move the block lengthwise of said bars.

2. A speed changer of the character described, comprising a casing, a pair of spaced parallel guide bars fixed in said casing, a shaft supporting block having bearings at its opposite ends, a shaft journalled in said bearings, said block being mounted on said bars for sliding movement, the bars being arranged at an acute angle to a plane perpendicular to said shaft whereby movement of said block on the bars produces an endwise movement of the shaft, means for adjusting said block on said bars comprising a rack on said block, a lever pivoted in said casing and having a segmental gear engaging said rack, the pivotal axis of said lever being parallel to said shaft, said casing having a slot through which said lever projects.

3. A speed changer of the character described, comprising a casing, a pair of spaced parallel guide bars fixed in said casing, a shaft supporting block having bearings at its opposite ends, a shaft journalled in said bearings, said block being mounted on said bars for sliding movement, the bars being arranged at an acute angle to a plane perpendicular to said shaft whereby movement of said block on the bars produces an endwise movement of the shaft, means for adjusting said block on said bars comprising a rack on said block, a lever pivoted in said casing and having a segmental gear engaging said rack, the pivotal axis of said lever being parallel to said shaft, said casing having a slot through which said lever projects, and said lever having locking means thereon cooperating with said casing to lock the lever in any desired adjusted position lengthwise of said slot.

CARL ROEHRI.